United States Patent [19]
Hamblin

[11] Patent Number: 4,898,481
[45] Date of Patent: Feb. 6, 1990

[54] BEARING ASSEMBLY

[75] Inventor: Ronald F. Hamblin, Luton, United Kingdom

[73] Assignee: SKF (UK) Limited, United Kingdom

[21] Appl. No.: 180,391

[22] Filed: Apr. 12, 1988

[30] Foreign Application Priority Data

Apr. 13, 1987 [GB] United Kingdom ............... 8798772

[51] Int. Cl.$^4$ ............................................. F16C 27/04
[52] U.S. Cl. ..................................... 384/581; 384/535
[58] Field of Search ............... 384/581, 535, 571, 584, 384/537, 490

[56] References Cited

U.S. PATENT DOCUMENTS 3,009,748  11/1961  Pitner ................................... 384/581
3,976,340  8/1976  Pitner ................................... 384/581
4,722,618  2/1988  Matsumoto et al. .................. 384/535

FOREIGN PATENT DOCUMENTS 62-124317  6/1987  Japan .
2008451  6/1979  United Kingdom .

Primary Examiner—Lenard A. Footland
Attorney, Agent, or Firm—Kinney & Lange

[57] ABSTRACT

A bearing assembly comprises a housing, a bearing and a shaft. Reaction to a radial load includes substantial components to each side of the radial load line and opposing each other. These components laterally stabilize the bearing. These reaction components arise because the assembly has an arcuate less stiff portion in line with the radial load line.

9 Claims, 3 Drawing Sheets

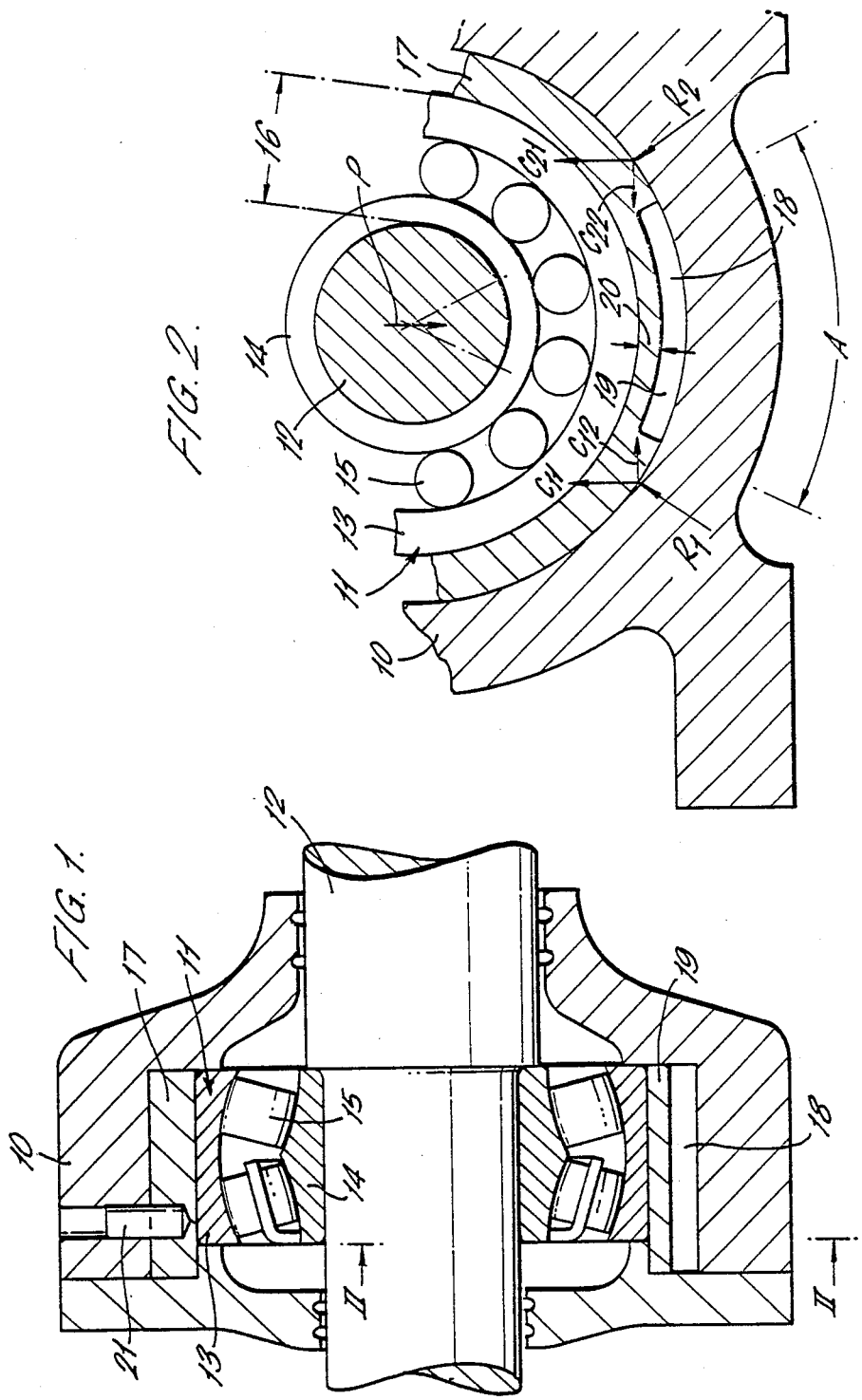

4,898,481

BEARING ASSEMBLY

TECHNICAL FIELD

This invention is concerned with a bearing assembly comprising a housing having a bore, a bearing which is disposed in the bore and a shaft which is supported by the bearing for rotation with respect to the housing.

The bearing may be a rolling element bearing, such as a spherical roller bearing, with an inner ring, an outer ring and a plurality of elements arranged to roll on the raceways of the two rings.

BACKGROUND ART

Conventional housings for use with rolling element bearings have, up until now, broadly uniform radial stiffness. Hence the resultant load path, that is the portion of the outer or inner bearing ring raceway onto which the rolling elements contact and transmit the load to or from the inner ring raceway, is positioned over one part of the periphery of the outer ring or inner ring raceway when the bearing is subjected to a radial load.

The use of a single load path is the hitherto commonly accepted load pattern and all the current bearing performance predictions are based on this assumption. However, disadvantages arise with a single load path arrangement particularly in situations which require the bearing to provide lateral stiffness (that is stiffness across the axis of the bearing) and where vibration free operation is required.

The current practice is to attempt to achieve these requirements by introducing a degree of pre-load into the bearing, that is, to at least remove all clearance between the rolling elements and the respective inner and outer ring raceways.

To obtain an optimum degree of pre-load within a bearing can be difficult, time consuming and costly with the desired result not being fully achieved as basically a single active load zone still exists for carrying the radial load. This method is in the main a compromise condition and the degree of pre-load is uncertain and difficult to maintain.

Patent specification No. GB-A-2008451 (Georg Fischer) discloses a bearing assembly which utilizes a dry running bearing having pads which are continuously adjustable by means of an hydraulic flow and control circuit to vary the pre-load. This manner of pre-loading to achieve stability of the shaft is used where the subsequent movements are small in magnitude and/or slow in speed.

In other more dynamically demanding applications, clearance with the bearing surfaces are necessary to accommodate expansion of the components resulting from the heat generated within the bearing from the loads carried and the speed of operation. GB-A-2008451 cannot provide the requirements of lateral stiffness and vibration free operation in these dynamically demanding applications, besides being a complicated and expensive system.

Patent specification No. JP-A-62-124317 (Application No. 60-262531) (Shinano) uses s ring between an outer ring of a ball bearing and the bore of a housing, which ring has two radially inner projections. However, this ring is made of an elastomer such as rubber and in the dynamically demanding applications envisaged would not provide the requirements of lateral stiffness and vibration free operation.

DISCLOSURE OF THE INVENTION

The invention provides a bearing assembly comprising a housing which has a bore, a bearing which is disposed in the bore and a shaft which is supported by the bearing for rotation with respect to the housing, wherein the bearing is supported by at least two portions of differing stiffness, the or each less stiff portion being arcuate and centered on bearing axis, such that the reaction to a load acting along a radius of the bearing includes substantial components to each side of that radius which are opposed to each other.

With such an arrangement, the reaction components give greater and predictable lateral control than an arrangement in which the reaction to the load is aligned with the radius.

By supporting the bearing itself, rather than having the support as being part of the bearing, the required type of bearing with the desired pre-load can be chosen for the particular application. The designed internal clearance (or pre-load) within the bearing is not disturbed.

Preferably, the housing includes a portion which is radially less stiff or more resilient than adjacent portions and is in line with that radius. The less stiff or more resilient portion cannot provide the complete or full reaction to the radial load so in effect splitting the reaction into more or less discrete parts.

The stiffness of this portion should be in the order of two or three times less than that of adjacent portions.

Preferably, the housing includes a sleeve, the less stiff portion being an integral part of a sleeve. This construction allows simple and economical production in which a sleeve or bush is machined to provide a recess such as a longitudinally extending groove so forming a less stiff portion.

Preferably the less stiff portion is provided by a recess which is radially spaced from the bearing. This feature allows a simple and economical realisation of the less stiff portion.

The recess may be positioned radially outside of the bearing for the case in which the load is transmitted from the shaft to the housing by way of the bearing, and may be positioned radially inside of the bearing for the case in which the load is transmitted from the housing to the shaft by way of the bearing.

Preferably, the less stiff portion extends longitudinally of the bearing and is unsupported at its ends. This construction ensures that the load acts along the complete length so eliminating any bowing effect along the length of the less stiff portion.

Preferably, the radial thickness of the less stiff portion is 0.15 x the sectional height of the bearing. The sectional height of a bearing is the radial distance from the bore to the outer surface. Also, the less stiff portion preferably subtends laterally an angle of 50° from the longitudinal axis of the bearing.

BRIEF DESCRIPTION OF THE DRAWINGS

FIG. 1 is part of a longitudinal section of a bearing assembly;

FIG. 2 is part of a section on II—II of the assembly shown in FIG. 1;

FIGS. 1 and 2 show a bearing assembly comprising a housing 10 having a bore, a bearing 11 which is disposed in the bore and a shaft 12 which is supported by the bearing for rotation about its longitudinal axis with respect to the housing. The bearing 11 has an outer race ring 13, an inner race ring 14 and a series of rolling elements 15 arranged between the race rings to roll on their raceways. The bearing 11 has a sectional height 16 which is the radial distance between the inner surface of the inner ring 14 and the outer surface of the outer ring 13.

Figure 3:
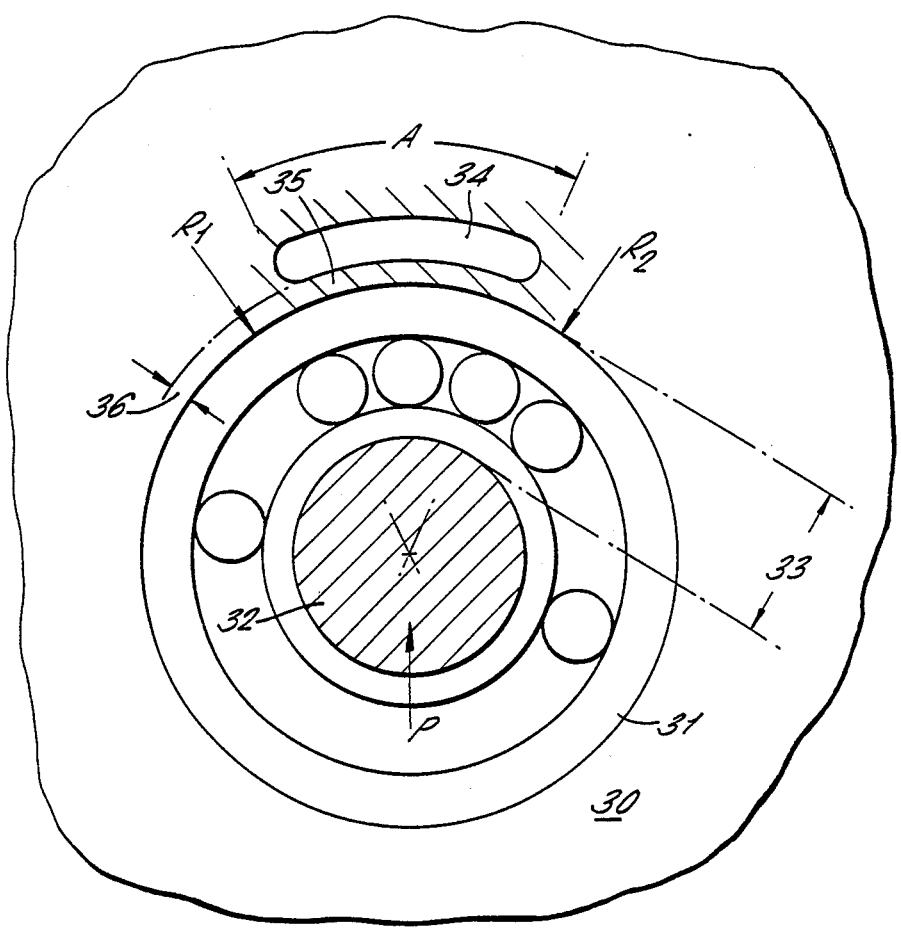
FIG. 3 is a cross-section of another bearing assembly.

The bearing 11 is mounted directly on the shaft 12 and is seated in the bore of a cylindrical sleeve 17 secured as a tight/accurate fit in the housing 10. In use of the assembly, a load P is transmitted from the rotating shaft 12 to the housing 10 by way of the bearing 11 and the sleeve 17. For the purposes of illustration, the load P is considered to act along a radius of the bearing 11 and to be constant in magnitude and direction. The sleeve 17 is provided with an arcuate recess 18 which is in its outer surface and so radially spaced from the bearing 11 and is in line with the radius along which the load P acts. The recess extends longitudinally of the sleeve 17 and forms an arcuate portion or strap 19, which is unsupported at its ends and centered on the axis of the bearing. The strap 19 is less stiff or more resilient than the rest of the sleeve—of the order of two to three times less radially stiff; and subtends an angle A of 50° at the longitudinal axis of the bearing. With the cross-sectional thickness of the housing wall supporting the bearing outer ring 13 being of the same order as the sectional height 16 of the bearing 11, the strap 19 has a radial thickness 20 in the order of 0.15 x the sectional height 16.

Because of the strap 19, the load zone has two lobes with centres lying approximately 35°" C on each side of the radius along which the load P acts. The forces in these lobes of the load zone have maximum peak reactions $R_1$ and $R_2$ acting radially of the bearing 11, where $$R_1 = R_2 = \frac{0,5 \cdot P}{\text{Cosine } 35°} = 0,61 \cdot P$$

These two reactions $R_1$ and $R_2$ can be resolved into components $C_{11}$, $C_{12}$ and $C_{21}$, $C_{22}$ respectively, with $C_{12}$ and $C_{22}$ being opposed and directed towards each other.

Thus, compared with a uniform load zone in a conventional bearing assembly, the resulting load is reduced by 39% so leading to an increased load bearing capacity.

The dimensions of the bearing 11, in particularly, the number of rolling elements 15, and the size of the angle A are chosen so that there are a sufficient number of the elements for transmitting load all the time in use of the assembly along the radial lines of action of the reactions $R_1$ and $R_2$.

To ensure that the sleeve 17 is fitted in its correct position, the housing 10 and the sleeve 17 are provided with bores. When the bores are aligned, the sleeve 17 is in the correct position and a pin 21 is then inserted to maintain the sleeve in position.

The bore of the sleeve 17 is finish machined, either before or after being fitted to the housing 10, to a diameter suitable to accommodate the bearing 11.

FIG. 3 shows basically a similar construction as that shown in FIGS. 1 and 2, with a housing 30, a bearing 31 and a shaft 32. The bearing 31 has a sectional height 33.

In use, a load P is transmitted radially from the shaft 32 to the housing 30 by way of the bearing 31. In this construction, there is no sleeve and the cross-section of the housing is significantly larger than the sectional height 33 of the bearing 31. The housing 30 has an arcuate recess 34 which is radially spaced from and on the outside of the bearing 31 and is in line with the radius along which the load P acts. The recess 34 extends longitudinally of the bearing 31 and forms an arcuate portion or strap 35 centered on the bearing axis. The strap 35 has a radial thickness 36 in the order of 0.15 x the sectional height 33 and subtends an angle A of 50° at the axis of the bearing 31. There are reactions $R_1$ and $R_2$ to the load P.

Figure 4:
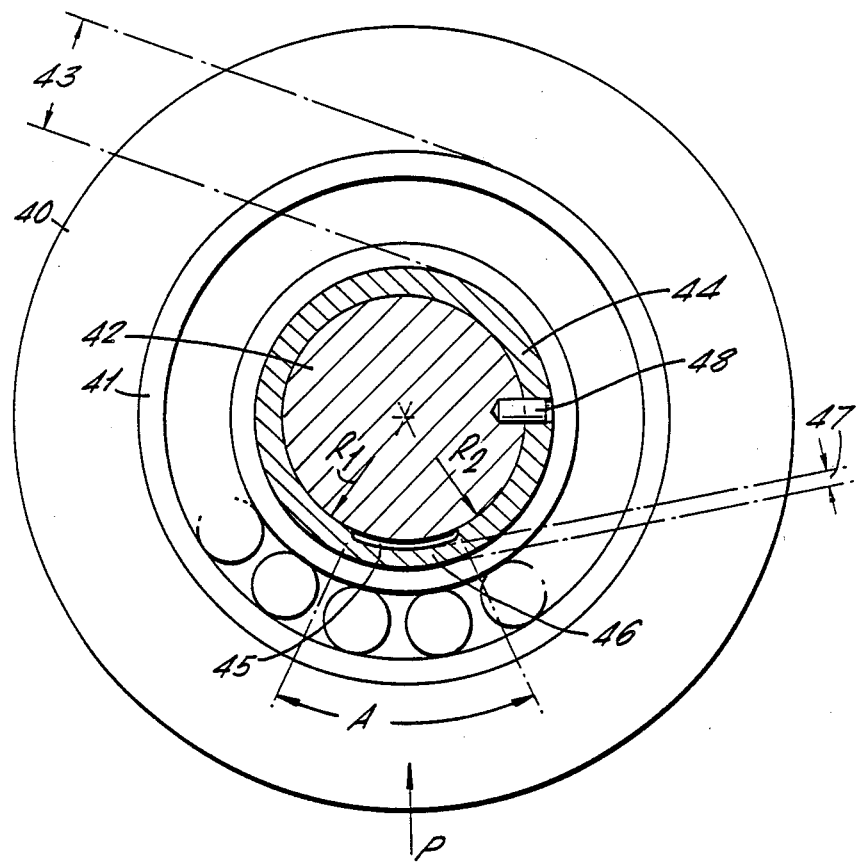
FIG. 4 is a cross-section of a further bearing assembly.

The construction shown in FIG. 4 comprises a housing 40 having a bore, a bearing 41 which is disposed in the bore and a shaft 42 which is supported by the bearing for rotation about its longitudinal axis with respect to the housing. The bearing 41 is a rolling bearing with a sectional height 43. The bearing 41 is seated directly in the bore of the housing and mounted on a cylindrical sleeve 44 which is mounted as a tight/accurate fit on the shaft 42.

In use of the assembly, a load P is transmitted from the rotating housing 40 to the shaft 32 by way of the bearing 41 and the sleeve 44. The sleeve 44 is provided with an arcuate recess 45 which is in its bore or inner surface and so radially spaced from the bearing 41 and is in line with the radius along which the load P acts. The recess 45 extends longitudinally of the sleeve 44 and forms an arcuate portion or strap 46 which is unsupported at its ends and centered on the bearing axis. The strap 46 subtends an angle A of 50° and has a radial thickness 47 in the order of 0.15 x the sectional height 43 of the bearing 41. The strap 46 is less stiff or more resilient than the rest of the sleeve 44—of the order of two to three times less radially stiff.

Because of the strap 46, the load P has two radially acting reactions $R_1$ and $R_2$, of which the maximum peak is 0.61P. When these reactions $R_1$ and $R_2$ are resolved into right angled components, two of the components are opposed to each other and act in opposite directions so laterally supporting the bearing 41.

To ensure that the sleeve 44 is fitted and maintained in its correct position on the shaft 42, the sleeve and shaft have radial bores. The sleeve 44 is in its correct position when the bores are aligned, whereupon a pin 48 is inserted and secured.

In summary, the constructions described and illustrated reduce the effective contact load on the raceway and roller elements; reduce the vibration within the bearing by spreading the load over a greater number of roller elements; and increase lateral stability by the reaction forces from the generated load zones.

In another aspect, each bearing is in effect supported at the corners of the recess, so causing the spread in the load.

What is claim is:

1. A bearing assembly comprising a housing having a bore, a bearing which is disposed in the bore and a shaft which is supported by the bearing for rotation with respect to the housing, wherein the bearing is supported substantially over its complete circumference by at least two portions of differing stiffness, which are circumferentially adjacent to each other and extend longitudinally of the bearing, each less stiff portion being arcuate and centered on the bearing axis, such that the reaction to a load acting along a radius of the bearing includes substantial components to each side of that radius which are opposed to each other.

2. An assembly as claimed in claim 1, wherein the housing includes the portion which is less stiff than adjacent portions and is in line with that radius.

3. An assembly as claimed in claim 2, wherein the housing includes a sleeve, the less stiff portion being an integral part of the sleeve.

4. An assembly as claimed in claim 3, wherein means fix the position of the sleeve in the housing.

5. An assembly as claimed in claim 1, wherein the less stiff portion is provided by a recess which is radially spaced from the bearing.

6. An assembly as claimed in claim 5, wherein the recess is positioned radially outside of the bearing.

7. An assembly as claimed in claim 1, wherein the radial thickness of the less stiff portion is 0.15 x the sectional height of the bearing.

8. An assembly as claimed in claim 1, wherein the less stiff portion subtends laterally an angle of 50° from the longitudinal axis of the bearing.

9. An assembly as claimed in claim 1, wherein the less stiff portion extends longitudinally of the bearing and is unsupported at its ends.

* * * * *

UNITED STATES PATENT AND TRADEMARK OFFICE
CERTIFICATE OF CORRECTION

PATENT NO. : 4,898,481
DATED : February 6, 1990
INVENTOR(S) : Ronald F. Hamblin

It is certified that error appears in the above-identified patent and that said Letters Patent is hereby corrected as shown below:

On the title page:

Under Foreign Application Priority Data, delete "8798772" and insert --8708772--.

In the References Cited Section, under FOREIGN PATENT DOCUMENTS, add the following:

| | | |
|---|---|---|
| 849045 | 9/1952 | Fed. Rep. of Germany |
| 2846555 | 5/1980 | Fed. Rep. of Germany |
| 126561 | 5/1919 | United Kingdom |
| 1204156 | 9/1970 | United Kingdom |
| 345771 | 4/1960 | Switzerland |
| 485957 | 2/1970 | Switzerland |

Signed and Sealed this

Twenty-fifth Day of December, 1990

Attest:

HARRY F. MANBECK, JR.

*Attesting Officer*   *Commissioner of Patents and Trademarks*